United States Patent [19]

Arp et al.

[11] Patent Number: 4,578,569
[45] Date of Patent: Mar. 25, 1986

[54] MULTI-WIDTH CARD READER WITH CANCELLATION FEATURE

[75] Inventors: Bradley W. Arp, Mound; Ronald O. J. Lindberg, Minneapolis; Wayne A. Mueller, Mound, all of Minn.

[73] Assignee: HEI, Inc., Victoria, Minn.

[21] Appl. No.: 505,903

[22] Filed: Jun. 20, 1983

[51] Int. Cl.$^4$ .............................................. G06K 7/10
[52] U.S. Cl. ................................. 235/454; 235/435; 235/482; 235/483
[58] Field of Search ............... 235/380, 382.5, 448, 235/449, 435, 454

[56] References Cited

U.S. PATENT DOCUMENTS

| | | |
|---|---|---|
| 2,968,521 | 1/1961 | Gross . |
| 3,695,510 | 10/1972 | Ruesch . |
| 3,793,600 | 2/1974 | Grosbard . |
| 4,204,637 | 5/1980 | Gray . |
| 4,271,351 | 6/1981 | Bloodworth .................. 235/449 X |
| 4,300,041 | 11/1981 | Nama . |
| 4,331,863 | 5/1982 | Sidline et al. ................. 235/449 X |

Primary Examiner—David L. Trafton
Attorney, Agent, or Firm—Orrin M. Haugen; Thomas J. Nikolai

[57] ABSTRACT

A hand-fed data-card reader compatible with cards of different widths and having a selectively actuable perforator for conveying cards past a reader head and for selectively cancelling desired cards via the perforation thereof. Cards are conveyed via a belt/pulley drive train that is operably coupled to a spiked perforator that engages each card at a preset one of two pressures so as to selectively convey the card with or without embossing the surface in a chadless fashion and whereby cancellation is achieved. Data media of differing widths are accommodated via an adjustable, lower, spring loaded guide assembly.

5 Claims, 7 Drawing Figures

MULTI-WIDTH CARD READER WITH CANCELLATION FEATURE

BACKGROUND OF THE INVENTION

The present invention relates to optical readers and in particular to a reader compatible with data bearing media of different widths and wherein a perforator drive wheel may be selectively actuated to cancel the medium, upon the reading thereof.

With the advent of the computer, punched cards and the like bearing machine readable data have become a commonplace part of daily life. Such cards typically contain data that is either machine entered and/or hand entered at appropriately designated locations on one or more of the card's surfaces. Such hard copies of the data are subsequently transferred or "dumped" onto other media (e.g. magnetic tape, disk memory, etc.), thus condensing the data. The data cards are then either stored or destroyed.

While most typically such data cards are encountered in computer processing operations, alternatively they may be encountered in school, personnel or time keeping settings, to name but a few of the settings where such data is generated. A problem often encountered upon first entering or reading such data from a card is one of providing a visual notice to the data entry operator that the entry of the card's data into the system has taken place. Specifically, once a card is read, no commercially available apparatus of which we are aware provides the operator with an indication of the cancellation or previous reading of the card. Thus, it is possible for an operator to re-read a card and enter redundant data. This redundant operation may, in turn, go undetected, due to the failure to mark the card for visual, tactile and/or machine inspection. The present invention, however, contemplates a photo-optic card reader that selectively perforates the data containing media as it is read so as to provide a visually and tactilely detectable indication that the data has already been once read.

While card readers with cancellation features have been developed for other applications, such readers are not configured to perform their cancellation tasks via a selectively actuable drive/perforator assembly. Rather, such prior art assemblies cancel the data containing media in a number of other different fashions with diferently configured hardware. Examples of some of these assemblies can be found upon reference to U.S. Pat. Nos. 2,968,521; 3,695,510; 3,793,600; 4,204,637 and 4,300,041, and which include apparatus that magnetically marks or alters the card, punches the card or slits portions therefrom.

In particular, it is to be noted that the aforementioned readers do not contain a drive assembly having a perforator/drive wheel for conveying the cards through the reader and for selectively perforating one or more surfaces thereof so as to provide a visual and tactile indication of cancellation. Furthermore, they do not show an assembly wherein one of the drive wheels may be used to transport a data bearing medium into and out of the reader station and which may be selectively actuated to grasp the cards with varying amounts of pressure, via a solenoid actuated linkage assembly, so as to individually cancel the cards with imprinted perforations. Additionally, the present apparatus differs from the prior art in that it is adaptable, via a floating card guide assembly, to read data bearing media of different widths. Thus, not only can standard punch cards be read and cancelled, but also the narrower webbed data tapes that are becoming more common can also be handled in this fashion.

The above objects, advantages and distinctions of the present invention as well as various others will, however, become more apparent upon reference to the following description thereof with respect to the following drawings. It is to be recognized, though, that while the following description is made with respect to the presently preferred embodiment of the present invention, various modifications thereto and/or other embodiments thereof are conceivable, without departing from the spirit of the present invention.

SUMMARY OF THE INVENTION

A card reader adaptable to reading data containing media of different widths and including a selectively actuable cancellation assembly, whereby the media may be cancelled by imprinting visually and tactilely detectable perforations thereon. The drive assembly comprises a belt/pulley driven perforator/drive wheel that is positioned so as to compressively engage at least one surface of a data bearing medium. The pressure exerted by the drive wheel is selectively variable, via a solenoid actuated linkage assembly, so that the compressive pressure of the wheel may be varied to perforate, in a chadless fashion, at least one surface the data containing medium.

A spring loaded guide assembly further accommodates media of differing widths by providing a pressure sensitive surface to guide and correct for slight misalignment of the media during in-feed.

DESCRIPTION OF THE PREFERRED EMBODIMENT

Figure 1:
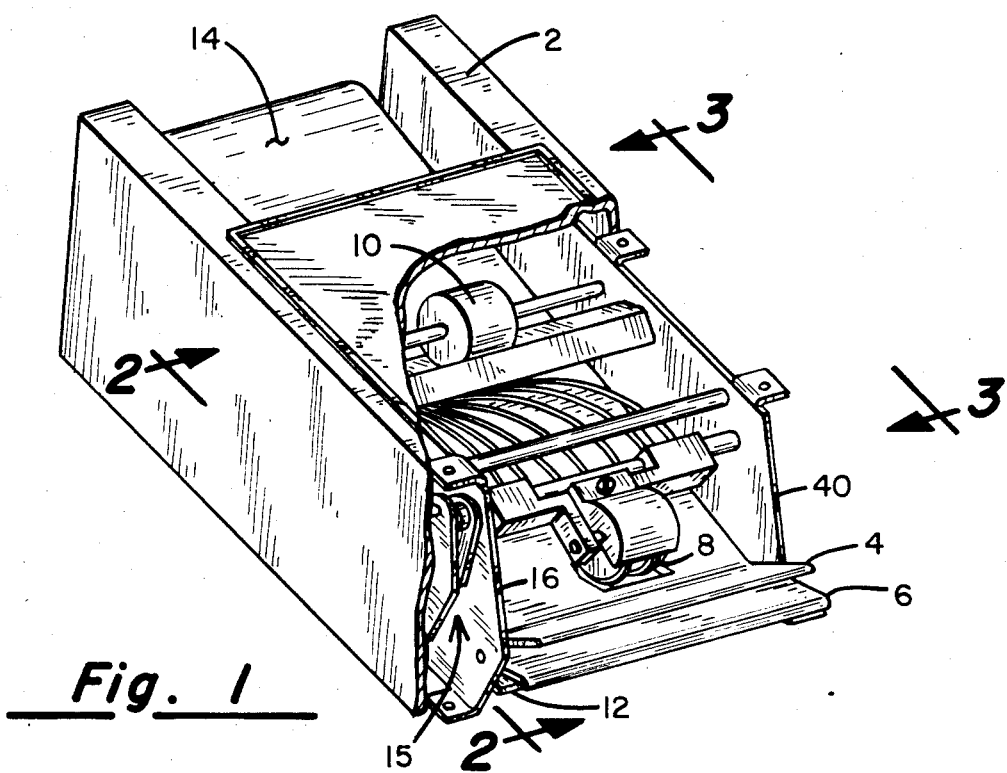
FIG. 1 shows a generalized perspective view in partial cutaway of the present card reader.

Referring to FIG. 1, there is illustrated a partial cutaway, perspective view of the preferred embodiment of a hand-fed card reader. It is generally comprised of an enclosure 2 that surrounds upper and lower infeed guides 4 and 6. Individual data containing media, most typically 3.25×7.375 inch cards, are received by the infeed guides and conveyed past a photo optic reader (not shown) via front and back, upper and lower drive-wheel pairs. In FIG. 1, only the uppermost drive wheels 8 and 10 are visible. Associated electronic circuitry is contained on a printed circuit card 12 (e.g. encoding/decoding, storing and interface circuitry) which is mounted to the bottom of the card reader, while the photo optic sensors are mounted immediately above the data card feedpath so as to detect the various data imprinted thereon. The associated belt/pulley drive assembly (not shown) is mounted on the opposite side of the card reader and is coupled to the lower drive wheels. It should be noted, though, that the location of the mounting of the above apparatus is not critical and may be varied as space and applications permit.

In normal operation, upon detecting the presence of a data card, the drive wheels engage so as to convey the card past the photo detectors to an output station 14. There the card is hand removed or momentarily held before being returned to the operator via the input feed guides 4 and 6, upon reversing the rotation of the drive wheels. Thus, either a feed-through or a reciprocating drive is achieved, depending upon how the control circuitry and mechanical linkage are set at the factory. Card readers of the type thus far described, however, have been and are still available through the present assignee, HEI, Inc. of Victoria, Minn. in a number of different models (e.g. Model 121-1, 121-3 and 121-4) and which models are, in turn, compatible with various different data formats (e.g. Hollerith or ASCII).

Such card readers have heretofore been employed in a variety of applications, from data processing to student testing, to race track betting and to various games of chance. Such card readers have been somewhat limited in their use due to the unavailability of an associated electro-mechanical assembly for cancelling the individual data cards as they are read. The present invention is, therefore, concerned with the modification of this apparatus so as to permit the cancellation of each of the data cards as it is read. Specifically, this is achieved by a chadless perforator wheel 8 that is substituted for the previously used smooth surface drive wheel. The wheel 8 may be made to selectively engage, via the side mounted linkage assembly 15, to for perforate the cards in a lengthwise fashion as they are fed through the reader. When not so engaged, the perforating drive wheel 8 is operative with reduced pressure and merely assists in conveying the cards past the reader without perforation. Furthermore, the presently modified card reader is configured so as to be adaptable to applications wherein data media of different widths are employed. The above-referenced features will, however, become more apparent upon reference to the remaining figures and the following description thereof.

Figure 2:
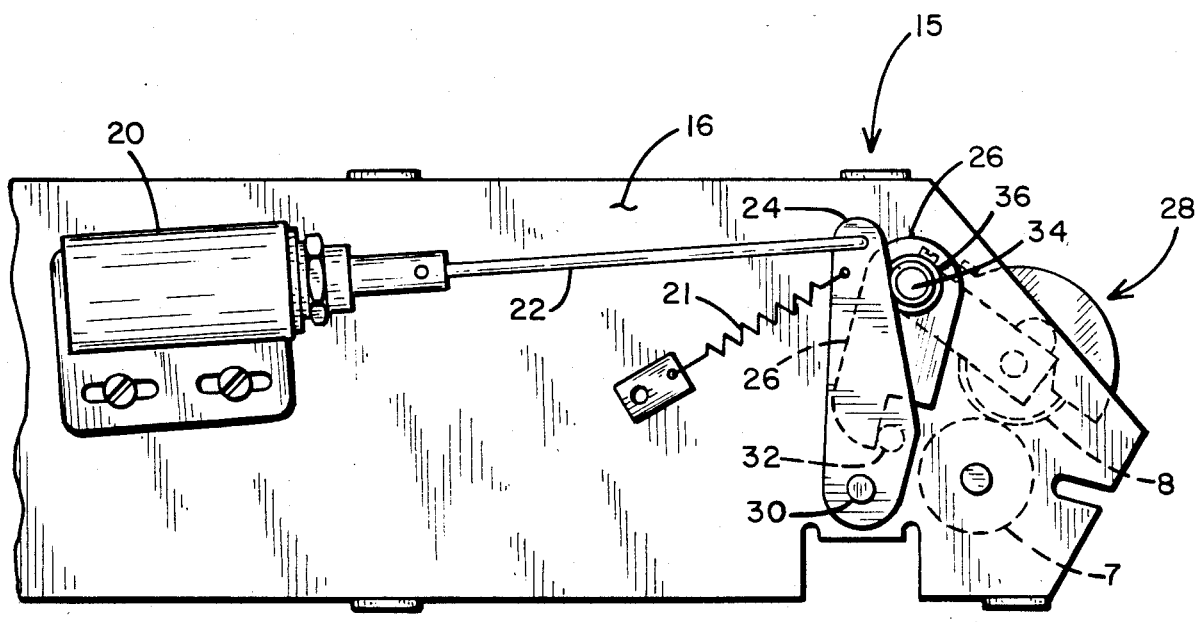
FIG. 2 shows a side view along the lines 2—2 of FIG. 1 of the present apparatus relative to the mounting of the perforator and its associated solenoid actuated linkage assembly.

Referring next to FIG. 2, a partial side view is shown of the card reader of this invention. It reveals the mechanical linkage assembly 15 which is mounted to the side rail 16. The assembly 15 is comprised of an electrically actuable solenoid 20, a linking arm 22, an amplifier arm 24 and a force arm 26, all of which are coupled by a shield/yoke assembly 28 (FIG. 2a) to the perforator drive wheel 8. In operation, this assembly acts to selectively pivot the perforator drive wheel 8 towards and away from the data card so as to exert varying amounts of pressure against it. During normal operation, the tension or pressure of the spring 21 is adjusted such that the wheel 8 always contacts the data card to facilitate the feed through or reciprocating feed operation. At other times, depending upon the type of feed operation, the solenoid 20 is engaged at appropriate times as the card passes through the reader to induce a greater pressure on the wheel 8 and thereby perforate the surface of the data media in a chadless fashion after the data has been read.

Upon engaging the solenoid 20, approximately a ⅛ inch stroke is imparted to the linking arm 22 to rotate the spring loaded amplifier arm 24 about a fixed pivot 30. The rotation of the amplifier arm 24, in turn, causes a staked pin 32 mounted thereto to engage one edge of a cutout formed in the force arm 26. The force arm 26 thereby causes the perforator shield/yoke 28 to rotate up or down relative to the data medium and with a force dependent upon the reference spring 21, since the force arm 26 is constrained to rotate about an associated axle 34, due to a set screw and collar assembly 36. Thus, as the solenoid 20 is actuated and released, linking arm 22 moves to and fro and imparts a rotative force to the perforator drive wheel 8, whereby the pressure of the wheel 8 against the data medium is varied.

Figure 2A:
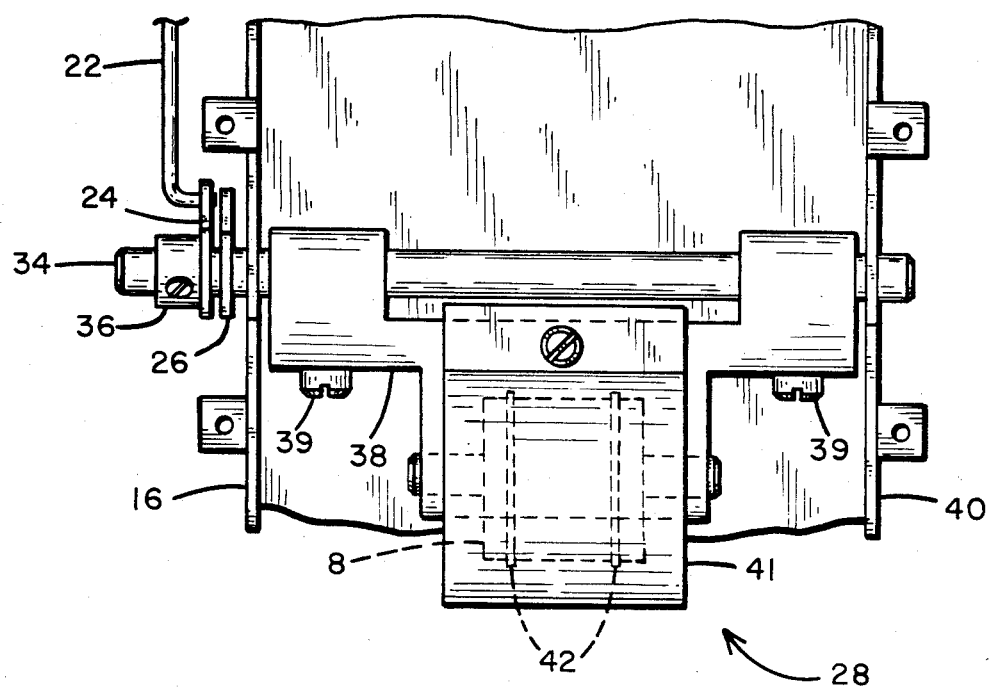
FIG. 2a shows a detailed top view of the shield/yoke assembly associated with the perforator drive wheel.
Figure 2B:
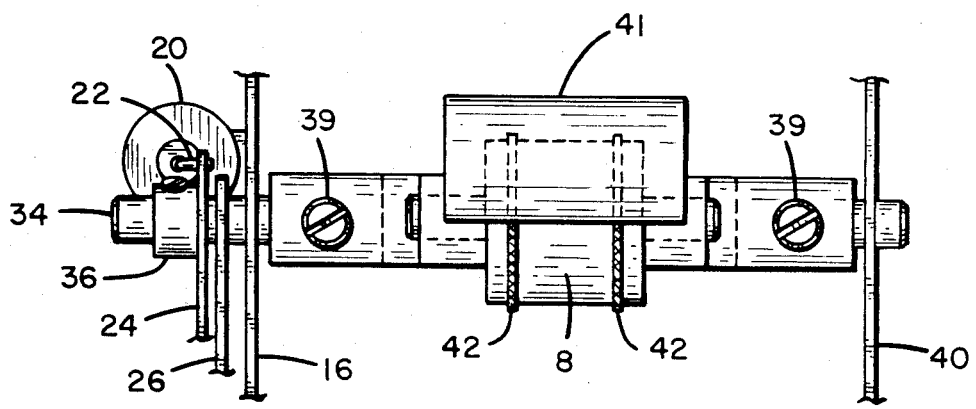
FIG. 2b shows a detailed front view of the shield/yoke assembly.

Referring next to FIGS. 2a and 2b, respective top and front views of the shield/yoke assembly 28 and perforator wheel 8 are shown. From these views, it can be seen that the shield/yoke assembly 28 is fabricated in two parts, one of which is a yoke member 38 that is fastened to the axle 34 by set screws 39. Axle 34 also passes through associated holes and bushings formed in the side members 16 and 40. The other portion consists of a separate arcuate shield 40 that overlies the wheel 8 and prevents inadvertent contact therewith, such as during maintenance.

Before continuing, it should be noted that the perforator wheel 8 is typically fabricated from a hardened nylon material and has two perforator rings 42 mounted thereabout. Specifically, rings 42 in the present apparatus are fabricated from hardened steel and are knurled at 48 points. Rings 42 have proven sufficient to form two lines of visually and tactilely detectable perforations on the data media. The presence of perforations, thus, advises the operator that the data media has been read, at least once. It should be noted, though, that while the disclosed apparatus uses two ring perforators 42, other shapes and types of perforators may alternatively be employed so as to provide a different width or pattern of perforation. The double ring arrangement has been found preferrable in that the symmetry of the ring placement ensures that the card or tape being read does not slip sideways or otherwise cant as the medium passes through the reader.

As mentioned, the present apparatus is further compatible with data media of different widths. In particular, it can be used to process standard width cards and two inch wide paper tape. Various other widths of media can be accommodated provided appropriate modifications along the lines to be described are made.

Figure 3A:
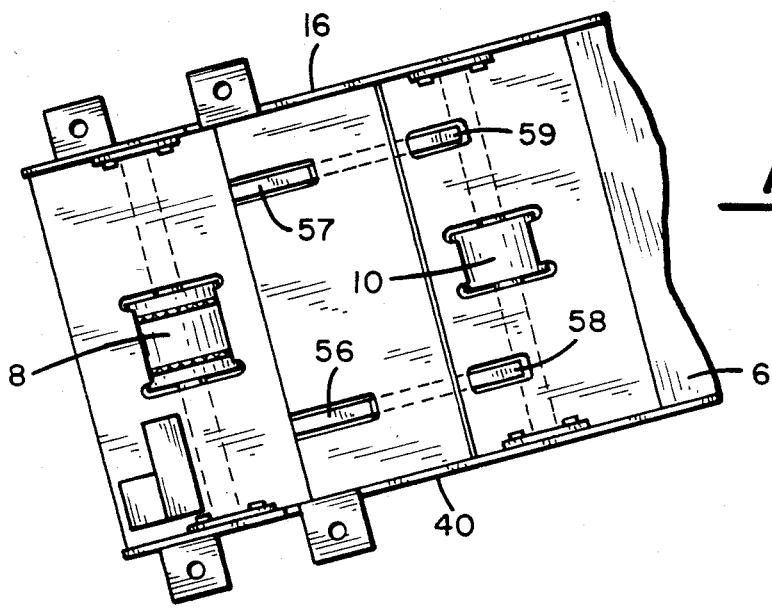
FIG. 3a shows a top view of the card guide assembly.
Figure 3:
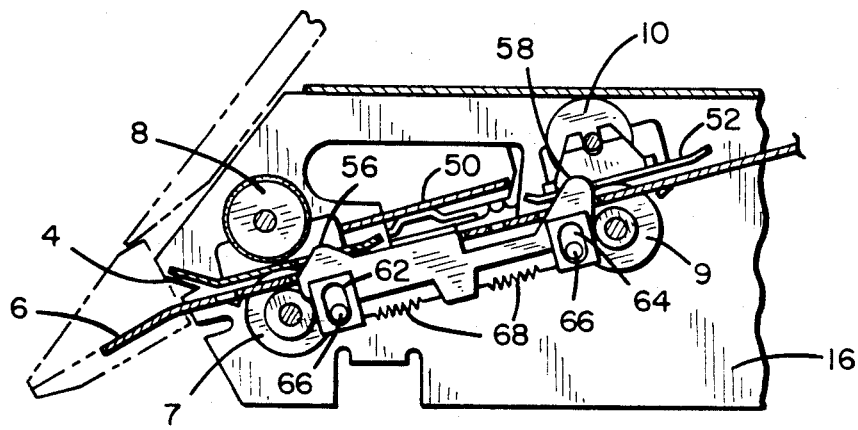
FIG. 3 shows a side view along the lines 3—3 of FIG. 1 and the mounting of the variable width card guide assembly.

Directing attention next to FIG. 3, a view along lines 3—3 of FIG. 1 is shown relative to the drive wheel pairs 7, 8 and 9, 10. From FIG. 3, it should be apparent that as the data medium is inserted between the infeed guides 4 and 6, it is constrained over its path of travel to pass between overlying underlying metallic guides and through which the drive wheels protrude frictionally contact and convey the data medium. The region between the drive wheel pairs 7, 8 and 9, 10 is thus the region wherein the multi-width card guide assembly is mounted so as to receive and align the media relative to the photo detectors and to ensure the proper alignment of the data fields relative to the photo optic sensors.

The card or tape guides for the present embodiment are supported above a spring suspension such that the guides are depressed upon encountering wide media, while remaining upright and acting as right and left guides for narrower media. In either case, however, the spring suspended guide assembly exerts an upward pressure against the bottom of the data medium as it traverses the area between the drive wheels so as to minimize any chance of damaging the card. Further, the ends of the guide assembly are right and left adjustable so as to ensure the proper alignment of the data bearing medium relative to the lateral midline of travel of the present apparatus.

In particular, intermediate guide region is comprised of an upper infeed read head 50 that aligns with an upper outfeed guide plate 52 and both overlie the continuous lower infeed plate 6. A pair of floating lower guide rails 54 are, in turn, mounted beneath the lower guide plate 6 such that a pair of associated spaced apart leading and trailing projections extend from each rail 54 through the lower guide plate 6 into the line of travel of the data media. While only the right side projections 56 and 58 are shown in FIG. 3, it is to be recognized that another pair of similarly shaped projections extend from the other guide rail 54 near the left side frame member 16 so that data media of two differing widths may be guided through the present apparatus by way of the side frame members 16 and 40 and the pairs of leading and trailing projections extending from the guide rails 54. The relative placement of the pairs of projections can be seen more clearly in FIG. 3a.

Referring to FIGS. 3 and 3a together, the present floating guide assembly 54, upon encountering data media approximately as wide as the distance between the side frame members 16 and 40, successively causes the leading and trailing pairs of projections 56, 57 and 58, 59 to be depressed to permit the card or tape to travel unobstructed over the lower guide plate 6. Should, however, a narrower width medium be fed into the present apparatus, the operator must appoximately center it such that it will pass through the channel between the leading and trailing projection pairs 56, 57 and 58, 59. Alternatively, an appropriately shaped throat housing may be mounted around the in-feed guides 4 and 6 so as to center the tape. In either case the projections are not depressed unless some slight misalignment occurs. Because of the floating nature of the guide rails 54, the projections 56, 57 and 58, 59 will slightly depress while exerting offsetting pressure against the data bearing medium to cause it to realign itself relative with the lateral midline of the reader, without damage to the card or tape being read. Even though not incorporated into the present design, sensors may be utilized to detect misalignment (for example with the depression of one side of the leading or trailing projections 56, 57 or 58, 59) and to cause the drive wheels to reverse, before the data medium being processed is damaged. The operator at that time, could then re-center the medium and re-try to read the data contained thereon.

Figure 3B:
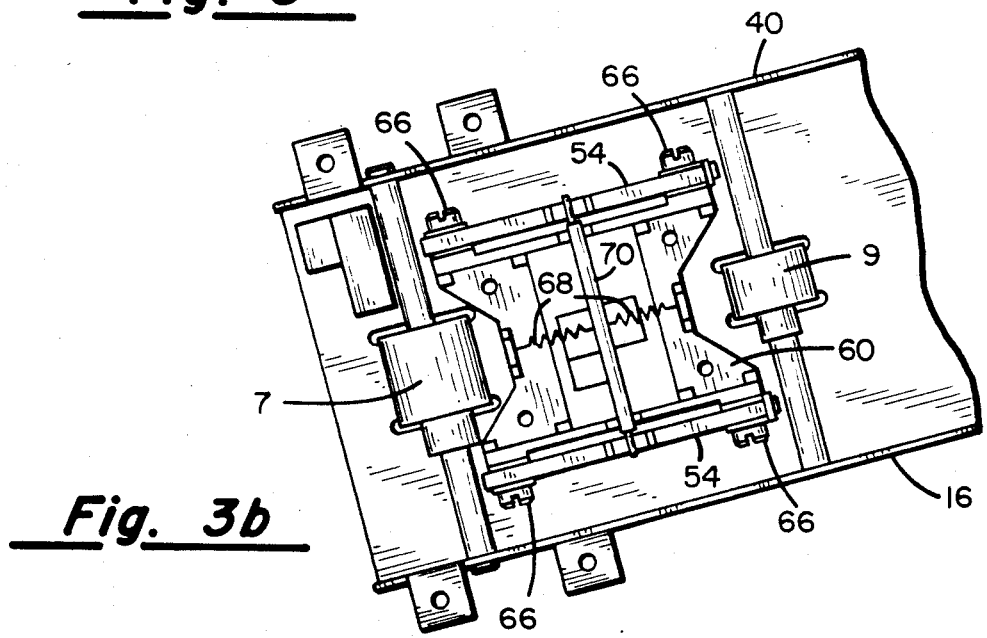
FIG. 3b shows a bottom view of the card guide assembly and the floating suspension provided thereby.

Referring next to FIG. 3b, a bottom view is shown of the entire guide assembly relative to the lower drive wheels 7 and 9. As illustrated, the present guide assembly is comprised of not only the floating guide rails 54 but also a stationary portion 60. The stationary portion 60 is mounted in a stationary fashion relative to the side frame members 16 and 40 and contains four screw guide ends 66 that are loosely contained in elongated slots 62 and 64 (only two of which are shown) that are formed in the sides of the floating guide rails 54. Thus, the slots 62 and 64 determine the maximum up or down travel of the projection pairs 56, 57 and 58, 59.

FIG. 3b also shows the nature of the floating mounting of the guide rails 54. It includes a pair of springs 68, one end of each being attached to the stationary portion 60 and the other end being affixed to a spindle 70 contained by the floating side rails. Thus, as the pairs of leading and trailing projections 56, 57 and 58, 59 rise and fall, the springs 68 expand and contract with the varying forces exerted thereon and, generally, impart a floating or "forgiving" action to the projections 56, 57 and 58, 59. The present apparatus thereby accomodates data containing media of differing widths. It should be recognized though that while presently described with respect to narrow, hand-fed media, in some applications the narrow media may instead be machine fed, thus further minimizing the possibility of media damage due to misalignment.

The present hand-fed card reader thus provides for a number of features which heretofor were unavailable and which, in particular, permit the cancellation of a data bearing medium as it is read and the accomodation of media of differing widths. Such improvements increase the applications and uses for card readers. It should be recognized, however, that while the present invention has been described with respect to its presently preferred embodiment, numerous other embodiments or modifications thereto are possible without departing from the spirit and scope of the present invention. It is, therefore, contemplated that the present invention should be interpreted so as to include all those equivalent embodiments as are within the spirit and scope of the following claims.

What is claimed is:

1. Improved apparatus for reading data containing media including driven means for frictionally grasping and conveying the medium past a reading station whereat the data contained thereon are detected, the improvement comprising:

(a) means including a perforator wheel operatively coupled to said driven means for embossing said data containing medium during the reading thereof and whereby the medium is visually and tactilely cancelled, said perforator wheel having a plurality of raised projections extending outwardly from the circumferential surface thereof and mounted adjacent to a relatively hard surface such that as the medium passes between said projections and said hard surface, at least one surface of the data containing medium is embossed.

2. Apparatus as set forth in claim 1 including means coupled to said perforator wheel for selectively varying the pressure exerted thereby against the data containing medium so as to selectively pass the data containing medium with or without embossing said medium.

3. Apparatus as set forth in claim 1 including guide means for receiving data containing media of differing widths and adjustably aligning the data containing media relative to the reading station, said guide means including a floating assembly having at least one pair of laterally displaced projections mounted so as not to obstruct the passage of a data containing medium of a first width, while channelling a data containing medium of a second width between said projections and correcting for minor misalignment of said data containing medium.

4. Apparatus as set forth in claim 3 wherein said guide means comprises:

(a) a depressably mounted guide member having a pair of leading and trailing projections extending from each one of a pair of laterally displaced rails, the lateral displacement between said rails defining said second media width;

(b) a stationary guide member; and
(c) spring means mounted to said stationary and floating guide members for supporting said pairs of rails and projections in a floating suspension such that corrective pressure is applied via the projections to the data containing medium in contact therewith.

5. Apparatus for conveying a data containing medium comprising:
(a) first and second side members spaced from one another and between which data containing medium is passed;
(b) means for reading data contained on said medium;
(c) means for conveying for said medium past said reading means; and
(d) means for selectively embossing said medium as it is read by said reading means, thereby cancelling said medium and preventing against inadvertent re-reading, said embossing means including
(i) a solenoid;
(ii) an amplifier arm coupled to said solenoid;
(iii) a force arm coupled to said amplifier arm;
(iv) a perforating drive wheel; and
(v) yoke means coupled to said force arm and to said perforating drive wheel and pivotally mounted to said first and second side members for rotatively varying the pressure exerted by said perforating drive wheel against said media, said pressure exerted by said perforating or drive wheel being dependent upon the angular displacement induced by said solenoid, amplifier arm and force arm.

* * * * *